US008008595B2

(12) United States Patent
Hergenhan et al.

(10) Patent No.: US 8,008,595 B2
(45) Date of Patent: Aug. 30, 2011

(54) ARRANGEMENT FOR GENERATING EXTREME ULTRAVIOLET RADIATION BY MEANS OF AN ELECTRICALLY OPERATED GAS DISCHARGE

(75) Inventors: Guido Hergenhan, Grossloebichau (DE); Christian Ziener, Jena (DE)

(73) Assignee: XTREME technologies GmbH, Jena (DE)

( * ) Notice: Subject to any disclaimer, the term of this patent is extended or adjusted under 35 U.S.C. 154(b) by 1186 days.

(21) Appl. No.: 11/693,207

(22) Filed: Mar. 29, 2007

(65) Prior Publication Data

US 2007/0230531 A1 Oct. 4, 2007

(30) Foreign Application Priority Data

Mar. 31, 2006 (DE) ......................... 10 2006 015 641

(51) Int. Cl.
*B23K 15/00* (2006.01)
*H05B 31/26* (2006.01)

(52) U.S. Cl. .............................. 219/121.35; 315/111.21

(58) Field of Classification Search ............. 219/121.11, 219/121.12, 121.21, 121.35, 121.36, 121.43, 219/121.6; 250/426, 493.1, 504 R, 505.1; 315/111.21

See application file for complete search history.

(56) References Cited

U.S. PATENT DOCUMENTS

| | | | | |
|---|---|---|---|---|
| 6,051,841 | A * | 4/2000 | Partlo | 250/504 R |
| 6,815,700 | B2 * | 11/2004 | Melnychuk et al. | 250/504 R |
| 7,477,673 | B2 * | 1/2009 | Ziener et al. | 372/87 |
| 7,812,542 | B2 * | 10/2010 | Hergenhan et al. | 315/111.21 |

FOREIGN PATENT DOCUMENTS

| | | |
|---|---|---|
| DE | 2536154 | 11/1976 |
| WO | 2005/025280 | 3/2005 |
| WO | WO 2005/101924 | 10/2005 |

* cited by examiner

*Primary Examiner* — Sang Paik

(74) *Attorney, Agent, or Firm* — Frommer Lawrence & Haug LLP

(57) ABSTRACT

An arrangement for generating extreme ultraviolet radiation by an electrically operated gas discharge which achieves an improvement in the adjustment of the layer thickness when applying a molten metal to the electrode surfaces and provides better protection against the uncontrolled spreading of molten metal into the environment that is associated with an increase in the rotational speed of the electrodes. It should be possible to increase the rotational speed to the extent that unconsumed discharge zones of the electrodes are always situated in the discharge area at repetition frequencies of several kilohertz. An edge area to be covered has at least one receiving area which extends circumferentially in a closed manner along the edge of the electrode on the electrode surface and which is constructed so as to be wetting for the molten metal and to which a liquid dispensing nozzle is directed for regenerative application of the molten metal.

18 Claims, 2 Drawing Sheets

ARRANGEMENT FOR GENERATING EXTREME ULTRAVIOLET RADIATION BY MEANS OF AN ELECTRICALLY OPERATED GAS DISCHARGE

CROSS-REFERENCE TO RELATED APPLICATION

This application claims priority of German Application No. 10 2006 015 641.2, filed Mar. 31, 2006, the complete disclosure of which is hereby incorporated by reference.

BACKGROUND OF THE INVENTION a) Field of the Invention

The invention is directed to an arrangement for generating extreme ultraviolet radiation by means of an electrically operated gas discharge with a discharge chamber which has a discharge area for a gas discharge for forming a plasma that emits the radiation, a first disk-shaped electrode and a second disk-shaped electrode, at least one of which electrodes is mounted so as to be rotatable, an edge area to be covered by a molten metal, an energy beam source for providing a pre-ionization beam, and a discharge circuit connected to the electrodes for generating high-voltage pulses.

b) Description of the Related Art

Studies carried out on a large number of electrode shapes for gas discharge sources such as Z-pinch electrodes, hollow-cathode electrodes, plasma focus electrodes or star pinch electrodes have shown that the lifetime of electrodes formed in this way is not sufficient for EUV projection lithography.

However, rotating electrodes, as they are called, have turned out to be a very promising solution for appreciably prolonging the life of gas discharge sources. One advantage is improved cooling of these electrodes, which are disk-shaped in particular. Further, shortening of the lifetime due to inevitable electrode erosion can be eliminated by continuously renewing the electrode surface.

A previously known device according to WO 2005/025280 A2 uses rotating electrodes that dip into a vessel containing molten metal, e.g., tin. The metal that is applied to the electrode surface is evaporated by laser radiation, whereupon the vapor is ignited by a gas discharge to form a plasma.

This technique is disadvantageous especially in that a desired layer thickness of the applied material can be adjusted only with difficulty. Further, on the one hand, upward of a certain rotational speed, spatter occurs and material exits from the bath when the disk-shaped electrodes are partially immersed in the molten metal. On the other hand, when the rotational speed is too low, unconsumed portions of electrodes are too slowly brought into the discharge area and cause instability in the plasma generation. This problem is particularly severe when applications require repetition rates of several kilohertz.

It would be desirable to adjust a distance between two areas on the electrode which serve successively as discharge zones so that this distance is greater than the radius of the area on the electrode surface serving as the discharge zone.

OBJECT AND SUMMARY OF THE INVENTION

Therefore, it is the object of the invention to achieve an improvement in the adjustment of the layer thickness when applying a molten metal to the electrode surfaces and to provide better protection against the uncontrolled spreading of molten metal into the environment that is associated with an increase in the rotational speed of the electrodes. In particular, it should be possible to increase the rotational speed to the extent that unconsumed discharge zones of the electrodes are always situated in the discharge area at repetition frequencies of several kilohertz.

This object is met in an arrangement for generating extreme ultraviolet radiation by means of electrically operated gas discharge of the type mentioned above in that the edge area to be covered has at least one receiving area which extends circumferentially in a closed manner along the edge of the electrode on the electrode surface and which is constructed so as to be wetting for the molten metal and to which a liquid dispensing nozzle is directed for regenerative application of the molten metal.

Particularly advisable and advantageous constructions and further developments of the arrangement according to the invention are indicated in the dependent claims.

Since the molten metal material should be in solid state in the discharge area, the liquid dispensing nozzle is preferably directed to the electrode surface in an area of the electrode which is provided for applying the molten metal and which is located opposite from the discharge area.

A particularly advantageous further embodiment of the invention consists in that the electrodes are shaped as circular disks and are rigidly connected to one another at a distance from one another and are mounted so as to be rotatable around a common axis of rotation which coincides with their center axes of symmetry, and each of the electrodes has the at least one receiving area on surfaces of the electrode that face one another, which receiving area is constructed so as to be wetting for the molten metal and to which a liquid dispensing nozzle is directed.

In order to prevent electrical short circuiting it is advantageous when a disk-shaped insulating body is provided in the electrode area provided for applying the molten metal, and the insulating body dips into the intermediate space between the two electrodes. In this construction, the liquid dispensing nozzles which are directed to the electrode surfaces of the two electrodes can be guided through the disk-shaped insulating body from opposite sides.

In another construction of the invention, the first electrode is mounted so as to be rotatable around an axis of rotation coinciding with its center axis of symmetry, and the second electrode is stationary. The rotatably mounted first electrode has a smaller diameter than the stationary second electrode and is embedded extra-axially in a cutout of the second electrode. The liquid dispensing nozzle is directed through an opening in the cutout to the at least one receiving area on the electrode surface of the first electrode, which receiving area is constructed so as to be wetting for the emitter material. An outlet channel leads from an annular groove which is introduced into the cutout and which surrounds the circumference of the rotatably mounted first electrode to a reservoir for the molten metal so that molten metal that is spun off runs into the reservoir and is available for reuse.

A pre-ionization of the emitter material is advantageous for the ignition of the plasma, particularly the evaporation of a droplet of advantageous emitter material injected between the electrodes.

For this purpose, on one hand, an injection device is directed to the discharge area and, at a repetition rate corresponding to the frequency of the gas discharge, supplies a series of individual volumes of an emitter material serving to generate radiation which are limited in amount so that the emitter material which is injected into the discharge area at a distance from the electrodes is entirely in the gas phase after the discharge. On the other hand, the pre-ionization beam supplied by the energy beam source is directed synchronous in time with the frequency of the gas discharge to a plasma generation site in the discharge area which is provided at a distance from the electrodes and in which the individual volumes arrive so as to be ionized successively by the pre-ionization beam.

Alternatively, the ignition of the plasma can also be initiated in that the molten metal which is applied regeneratively is the emitter for generating radiation to which the pre-ionization beam supplied by the energy beam source is directed synchronous in time with the frequency of the gas discharge in the discharge area.

Due to the discharge process in which a plasma radiating in the EUV range is formed, a portion of the applied layer in the area of influence of the plasma is evaporated on the electrode surface or expelled as melt. This amounts to about $10^{-7}$ to some $10^{-6}$ grams per pulse. This loss of mass is compensated by the continuous supply of molten metal so that a constant protective layer remains on the electrode surface even under discharge conditions at repetition frequencies of several kilohertz.

The application of the molten metal according to the invention also has a particularly advantageous effect because the two rotating electrodes can contact the discharge circuit with a particularly low inductance owing to their horizontal arrangement.

Therefore, in another construction of the invention the electrodes have electrical contact with contact elements which are arranged coaxial to the axis of rotation and which are immersed in ring-shaped baths of molten metal which are electrically separated from one another and which communicate with a discharge circuit of the high-voltage power supply.

In another construction, electrical contact can also be carried out via the liquid dispensing nozzle and the liquid jet.

The invention will be described more fully in the following with reference to the schematic drawings.

DESCRIPTION OF THE PREFERRED EMBODIMENTS

Figure 1:
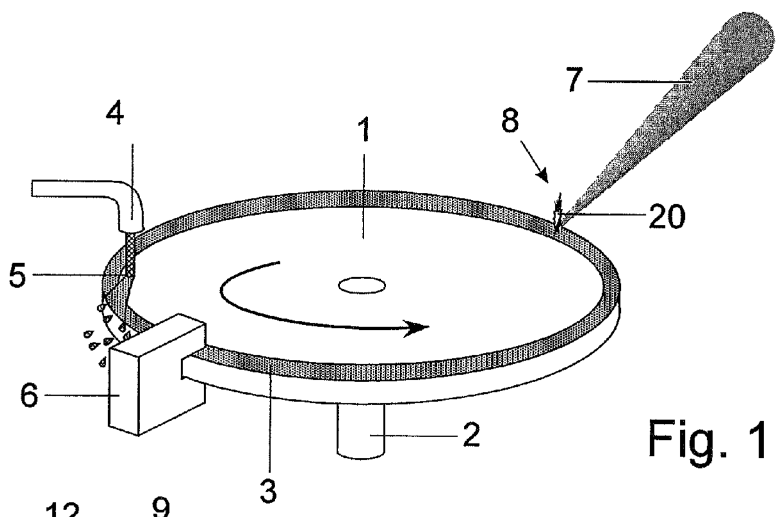
FIG. 1 illustrates the inventive principle of applying a defined thin layer of molten metal along a track on a rotating electrode surface.

In FIG. 1 which illustrates the principle of the invention, a disk-shaped electrode 1 is rigidly connected to a rotatable shaft 2 in such a way that the center axis of symmetry of the electrode coincides with the axis of rotation R-R. An edge track running around the circumference of the electrode surface serves as a receiving area 3 for a molten metal, e.g., tin or a tin alloy, and is constructed so as to be wetting for this material. Wetting surfaces for the edge track can comprise, e.g., copper, chromium, nickel or gold.

The rest of the electrode surface, or at least a portion of the electrode surface adjoining the receiving area, should not be wetting for the emitter material because application of the molten metal is not desired here. Suitable non-wetting surfaces can comprise, e.g., PTFE, stainless steel, glass, or ceramic.

A liquid dispensing nozzle 4 of a fluid generator is directed to the receiving area 3 to apply the molten metal to the receiving area 3 in a regenerative manner as a liquid jet 5 during the rotation of the electrode 1. Since the applied molten metal is propelled to the edge of the electrode by centrifugal force, it is necessary to provide splash protection 6 so that the molten metal that detaches is prevented from spreading in an uncontrolled, undefined manner.

Depending on the amount of molten metal to be supplied, the rotational speed of the electrode, the diameter of the electrode, and the temperature of the molten metal as well as that of the electrode, a layer between 0.1 μm and 100 μm is applied. The appropriate regulating devices required for this purpose need not be discussed herein, as the person skilled in the art can find suitable solutions.

An energy beam, e.g., a laser beam, serving as a pre-ionization beam 7 is directed in a discharge area 8 to an injected droplet of advantageous emitter material in order to evaporate it.

Figure 2:
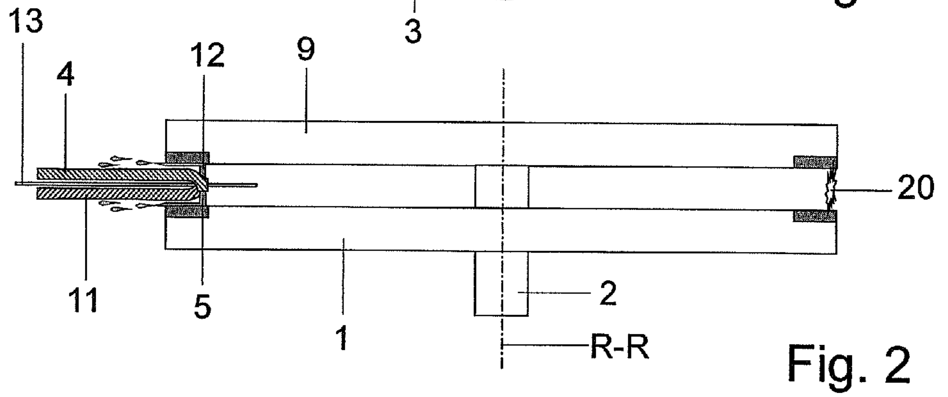
FIG. 2 shows an arrangement for applying a molten metal to opposing electrode surfaces of two electrodes which are rigidly connected to one another and mounted so as to be rotatable around a common axis.

In the construction shown in FIG. 2, a first disk-shaped electrode 1 and a second disk-shaped electrode 9 are rigidly connected to the rotatably mounted shaft 2 at a distance from one another in such a way that the center axes of symmetry of the electrodes 1, 9 coincide with the axis of rotation (R-R) of the shaft 2. Each of the electrodes 1, 9 contains on its surface facing the other electrode surface a receiving area 3, 10 which is constructed as an edge track and acts in a wetting manner for the molten metal and to which a liquid dispensing nozzle 4, 11 is directed. The receiving areas 3, 10 are arranged on the electrode surfaces in such a way that they lie opposite one another.

In order to prevent electrical short circuiting between the electrodes 1, 9 via the liquid jets 5, 12 of molten metal, a disk-shaped insulating body 13, particularly an electrically insulating ceramic plate, is provided and is immersed in the intermediate space between the two electrodes 1, 9 in an electrode area provided for applying the molten metal.

As is illustrated in FIG. 2, the two liquid dispensing nozzles 4, 11 are guided through the electrically insulating ceramic plate from opposite sides, one liquid dispensing nozzle 4 works in direction of the force of gravity and the other liquid dispensing nozzle 11 works in countercurrent with the force of gravity.

Figure 3:
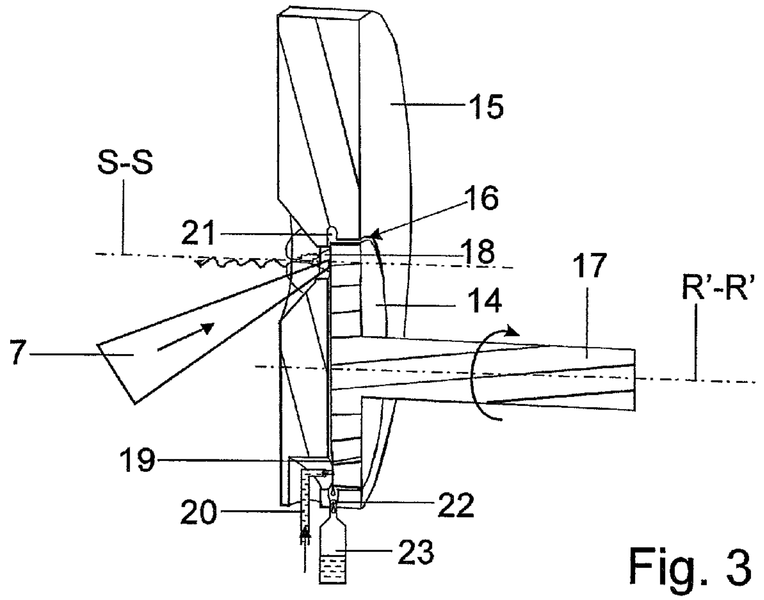
FIG. 3 shows an arrangement for applying a molten metal to a rotatably mounted electrode which is embedded in a stationary electrode.

As is shown in FIG. 3, another construction of the invention comprises a pair of electrodes, only one of which, the cathode electrode 14, is rotatably mounted. The latter has a smaller diameter than the other, stationary electrode (anode electrode 15) in which the cathode electrode 14 is recessed into a cutout 16 extra-axially so that its axis of rotation R'-R' is oriented eccentrically parallel to the axis of symmetry S-S of the anode electrode 15. The cathode electrode 14 is rigidly fastened to a shaft 17 which is received by suitable bearings and whose driving means lie outside the discharge chamber.

The two electrodes 14, 15 are insulated with respect to one another so as to resist dielectric breakdown in that they are at a distance from one another that is so dimensioned that a discharge is prevented from reaching a desired position of the plasma generation (pinch position) by vacuum insulation. This position lies within the discharge area in the region of an outlet opening 18 for the generated radiation that is provided in the anode electrode 15. A liquid dispensing nozzle 20 is directed through an opening 19 in the cutout 16 to a wetting receiving area on an edge track of the electrode surface of the cathode electrode 14.

Further, an annular groove 21 surrounding the circumference of the cathode electrode 14 is introduced in the cutout 16, an outlet channel 22 leads from the annular groove 21 to a reservoir 23 for the molten metal. The annular groove 21 is advantageously coated with a non-wetting surface.

Figure 4:
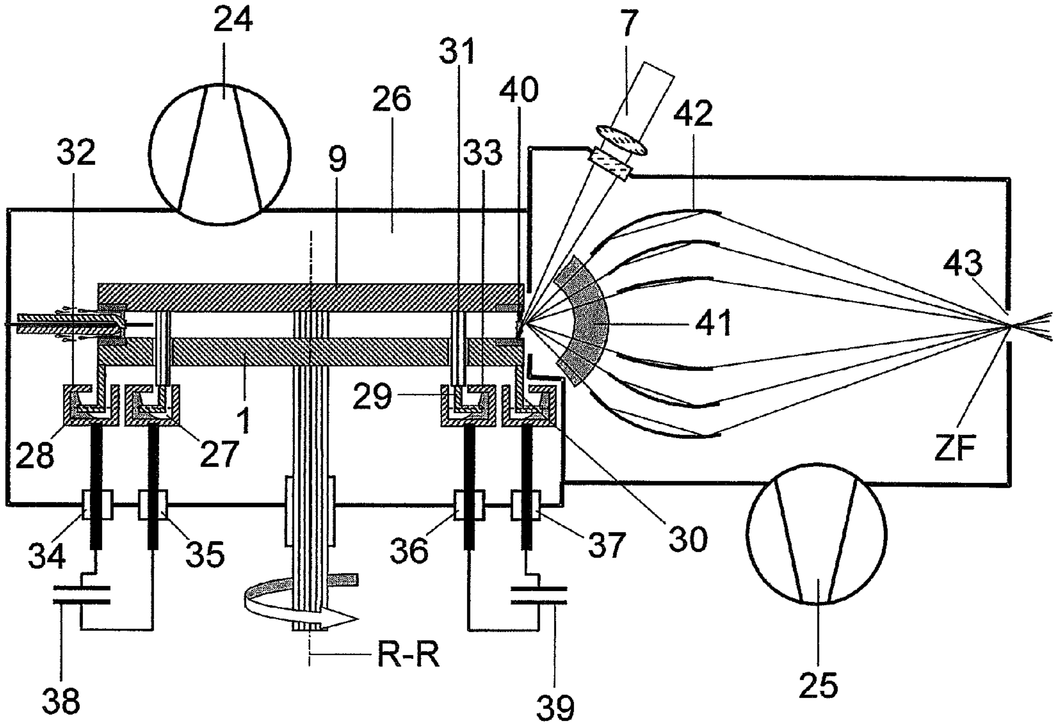
FIG. 4 shows a first construction of a radiation source with a rotating electrode arrangement according to the invention.

The radiation source shown in FIG. 4 contains a rotating electrode arrangement according to FIG. 2 in a discharge chamber 26 which can be evacuated by means of vacuum pumps 24, 25. Electric feeds 1, 9 to the electrodes are preferably carried out via ring-shaped, electrically separated baths 27, 28 of molten metal, e.g., tin or other low-melting metals, e.g., gallium, into which the electrodes 1, 9 dip via contact elements 29, 30. The contact elements 29, 30 either comprise a plurality of individual contacts (contact elements 29) which are arranged along a ring on one electrode 9 and guided through openings 31 in the other electrode 1 so as to be electrically insulated or are formed as a closed cylinder ring (contact element 30). Suitable partial covers of the melt baths 27, 28 in the form of inwardly turned outer walls 32, 33 prevent the molten metal that is pushed outward from exiting the vessels for the melt baths 27, 28.

Since an arrangement of the type mentioned above requires horizontally arranged electrodes 1, 9 and a vertically directed axis of rotation R-R, a technique for applying a molten metal, such as is provided by the invention, is particularly advantageous because, in contrast to what was previously known, the molten metal cannot be applied to the electrodes 1, 9 against the force of gravity.

The rotating electrode arrangement according to the invention allows current pulses to be supplied to the electrodes 1, 9 without wear and, above all, with low inductance. Further, for this purpose, the melt baths 27, 28 are electrically connected from the discharge chamber 26 to capacitor elements 38, 39 via electric vacuum feedthroughs 34 to 37. The capacitor elements 38, 39 are part of a discharge circuit which ensures, by generating high-voltage pulses at a repetition rate between 1 Hz and 20 kHz and by a sufficient pulse quantity, that a discharge is ignited in the discharge area 8 that is filled with a discharge gas and a high current density is generated which pre-ionizes emitter material so that radiation of a desired wavelength (EUV radiation) is emitted by a plasma 40 that is formed.

After passing through the debris protection device 41, the emitted radiation reaches collector optics 42 which direct the radiation to a beam outlet opening 43 in the discharge chamber 26. Imaging the plasma 40 by means of the collector optics 42 generates an intermediate focus ZF which is localized in or in the vicinity of the beam outlet opening 43 and which serves as an interface to exposure optics in a semiconductor exposure installation for which the radiation source, preferably constructed for the EUV wavelength region, can be provided.

The ignition of the plasma 40 can be initiated in a particularly advantageous manner through evaporation of a droplet of advantageous emitter material injected between the electrodes 1, 9. An advantageous emitter material of the kind mentioned above can be xenon, tin, tin alloys, tin solutions or lithium. As was already shown in FIG. 1, the energy beam 7 which is directed to an injected droplet in the discharge area 8 so as to be synchronized with respect to time with the frequency of the gas discharge is preferably used for the pre-ionization of the emitter material.

Figure 5:
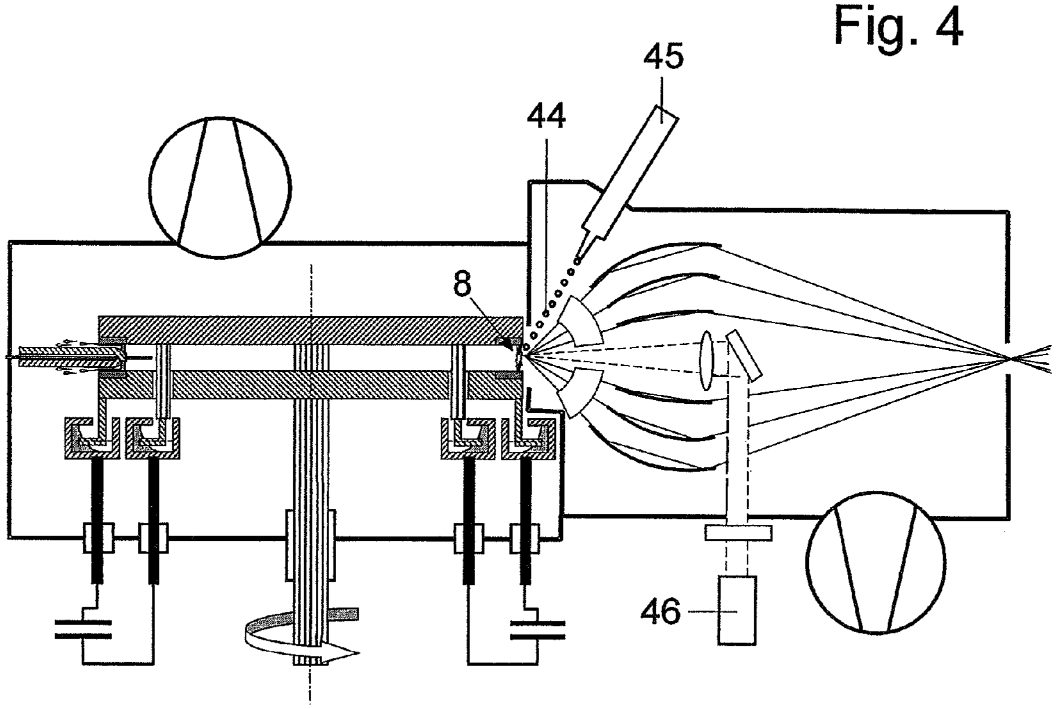
FIG. 5 shows a second construction of a radiation source with a rotating electrode arrangement according to the invention.

Therefore, in another construction according to FIG. 5, the emitter material is introduced into the discharge area 8 in the form of individual volumes 44, particularly at a location in the discharge area 8 that is provided at a distance from the electrodes 1, 9 and at which the plasma is generated. The individual volumes 44 are preferably provided as a continuous flow of droplets in dense, i.e., solid or liquid, form at a repetition rate corresponding to the frequency of the gas discharge by means of an injection device 4 that is directed to the discharge area 8. Each individual volume is limited in amount in such a way that it is entirely in gaseous phase after the discharge and can easily be pumped out. The pulsed pre-ionization beam 7 which is provided by an energy beam source 46, preferably a laser beam of a laser radiation source, is directed to the plasma generation site in the discharge area 8 so as to be synchronized with respect to time with the frequency of the gas discharge in order to evaporate the individual volumes 44 in the form of droplets.

When the molten metal which is applied regeneratively to the electrodes 1, 9 is emitter material, the energy beam 7 for pre-ionization of the emitter material can also be directed thereto synchronous in time with the frequency of the gas discharge, namely either only to one electrode 1 or 9, or simultaneously to both electrodes 1, 9, or alternately to one and then the other electrode 1 or 9.

While the foregoing description and drawings represent the present invention, it will be obvious to those skilled in the art that various changes may be made therein without departing from the true spirit and scope of the present invention.

What is claimed is:

1. An arrangement for generating extreme ultraviolet radiation by an electrically operated gas discharge, comprising:

a discharge chamber which has a discharge area for a gas discharge for forming a plasma that emits the radiation;

a first disk-shaped electrode and a second disk-shaped electrode, at least one of which electrodes being mounted so as to be rotatable and having an edge area to be coated with a molten metal;

a liquid dispensing nozzle configured to apply the molten metal onto the edge area to be coated;

an energy beam source for providing a pre-ionization beam;

a discharge circuit connected to the electrodes for generating high-voltage pulses; and said edge area to be coated having at least one receiving area which extends circumferentially in a closed manner along the edge of a surface of the electrode and which is constructed so as to be adhesive for the molten metal and to which said liquid dispensing nozzle is directed for regenerative application of the molten metal.

2. The arrangement according to claim 1;

wherein the liquid dispensing nozzle is directed to the electrode surface in an area of the electrode which is provided for applying the molten metal and which is located opposite from the discharge area.

3. The arrangement according to claim 2;

wherein the electrodes are shaped as circular disks and are rigidly connected to one another at a distance from one another and are mounted so as to be rotatable around a common axis of rotation which coincides with their center axes of symmetry, and each of the electrodes having the at least one receiving area on surfaces of the electrode that face one another, which receiving area is constructed so as to be wetting for the molten metal and to which a liquid dispensing nozzle is directed.

4. The arrangement according to claim 3;

wherein a disk-shaped insulating body is provided in the electrode area which is provided for applying the molten metal, and the insulating body is immersed in the intermediate space between the two electrodes to prevent short circuiting.

5. The arrangement according to claim 4;

wherein the liquid dispensing nozzles which are directed to the electrode surfaces of the two electrodes are guided through the disk-shaped insulating body from opposite sides.

6. The arrangement according to claim 1;

wherein the electrodes have electrical contact with contact elements which are oriented coaxial to the axis of rotation and which are immersed in ring-shaped baths of molten metal which are electrically separated from one another and which communicate with a discharge circuit of the high-voltage power supply.

7. The arrangement according to claim 1;

wherein the electrical contact of the electrodes is carried out via the liquid dispensing nozzle and a liquid jet dispensed by the liquid dispensing nozzle.

8. The arrangement according to claim 2;

wherein the first electrode is mounted so as to be rotatable around an axis of rotation coinciding with its center axis of symmetry, and the second electrode is stationary, and wherein the rotatably mounted first electrode has a smaller diameter than the stationary second electrode and is embedded extra-axially in a cutout of the second electrode, wherein the liquid dispensing nozzle is directed through an opening in the cutout to the at least one receiving area on the electrode surface of the first electrode, which receiving area is constructed so as to be wetting for the emitter material.

9. The arrangement according to claim 8;

wherein an annular groove from which an outlet channel leads to a reservoir for the molten metal is introduced into the cutout and surrounds the circumference of the rotatably mounted first electrode.

10. The arrangement according to claim 1;

wherein copper, chromium, nickel or gold are provided as wetting means for the receiving area.

11. The arrangement according to claim 10;

wherein at least one portion of the electrode surface adjoining the receiving area is non-wetting for the molten metal.

12. The arrangement according to claim 11;

wherein the portion of the electrode surface adjoining the receiving area comprises PTFE (Teflon), stainless steel, glass, or ceramic.

13. The arrangement according to claim 1;

wherein an injection device is directed to the discharge area and, at a repetition rate corresponding to the frequency of the gas discharge, supplies a series of individual volumes of an emitter material serving to generate radiation which are limited in amount so that the emitter material which is injected into the discharge area at a distance from the electrodes is entirely in the gas phase after the discharge.

14. The arrangement according to claim 13;

wherein the pre-ionization beam supplied by the energy beam source is directed synchronous in time with the frequency of the gas discharge to a plasma generation site which is provided in the discharge area at a distance from the electrodes and in which the individual volumes arrive so as to be ionized successively by the pre-ionization beam.

15. The arrangement according to claim 1;

wherein the molten metal which is applied regeneratively is the emitter for generating radiation to which the pre-ionization beam supplied by the energy beam source is directed synchronous in time with the frequency of the gas discharge in the discharge area.

16. The arrangement according to claim 15;

wherein the pre-ionization beam is directed alternately to the regeneratively applied emitter material of the first and second electrodes.

17. The arrangement according to claim 1;

wherein the pre-ionization beam is directed simultaneously to the regeneratively applied emitter material of the first and second electrodes.

18. The arrangement according to claim 1;

wherein xenon, tin, tin alloys, tin solutions or lithium are provided as emitter material.

* * * * *